United States Patent

[11] 3,601,812

[72] Inventor Joseph A. Weisbecker Cherry Hill, N.J.
[21] Appl. No. 793,043
[22] Filed Jan. 22, 1969
[45] Patented Aug. 24, 1971
[73] Assignee RCA Corporation

[54] MEMORY SYSTEM
21 Claims, 7 Drawing Figs.

[52] U.S. Cl. .......... 340/172.5
[51] Int. Cl. .......... G11c 15/00, G11c 7/00
[50] Field of Search .......... 340/172.5, 174, 173

[56] References Cited

UNITED STATES PATENTS

| | | | |
|---|---|---|---|
| 3,238,510 | 3/1966 | Ergott, Jr. | 340/172.5 |
| 3,241,123 | 3/1966 | Boucheron | 340/172.5 |
| 3,243,786 | 3/1966 | Davies | 340/172.5 |
| 3,248,708 | 4/1966 | Haynes | 340/172.5 |
| 3,251,041 | 5/1966 | Chu | 340/172.5 |
| 3,275,991 | 9/1966 | Schneberger | 340/172.5 |
| 3,402,398 | 9/1968 | Koerner et al. | 340/173 |

*Primary Examiner*—Paul J. Henon
*Assistant Examiner*—Paul R. Woods
*Attorney*—H. Christoffersen

ABSTRACT: Memory system for buffering several computers to a central storage unit or a computer to several small memory units, and a partitioned address scheme for the efficient use thereof. The digits of the address are decomposed into two disjoint subsets, one of which is used as a buffer memory address and the other of which is stored with the data word to effect identification thereof.

INVENTOR
Joseph A. Weisbecker
BY H. Christoffersen
ATTORNEY

INVENTOR
Joseph A. Weisbecker

BY H. Christoffersen
ATTORNEY

INVENTOR
*Joseph A. Weisbecker*
BY [signature]
ATTORNEY

INVENTOR
Joseph A. Weisbecker
BY H. Christoffersen
ATTORNEY

MEMORY SYSTEM

BACKGROUND OF THE INVENTION

Data processing systems can operate faster than the large size random access memory device usually associated therewith. However, their timing cycle is dependent upon and designed around the memory cycle time. A memory cycle is normally divided into two parts, a read cycle and a write cycle. In destructive readout memories, the write cycle is sometimes referred to as the regeneration cycle.

Time sharing applications and multiprocessing computers make greater demands on the memory device than do standard computers. Time sharing is the use of one computer to perform several programs by a multiplexing arrangement, i.e., each program uses the entire computer for short, successive periods of time, usually measured in microseconds, each program's segments being interleaved with segments of the other programs. Multiprocessing is the concurrent execution of several programs or the concurrent execution of several parts of one program by a single computer system which is specially designed for the purpose.

The efficiency of a system can be improved by using a faster memory, and also, by the use of several small memories instead of one large one. The latter technique permits an arrangement whereby the computer waits only during the read cycle of the memory. Once the data is transferred from the memory to the computer, the computer can resume operation on the data, leaving the memory to complete the regeneration cycle. As soon as access to one memory is completed, access to another can be initiated immediately, avoiding the delay which would be occasioned by the regeneration cycle of the first.

During multiprocessing, several processors may attempt to access the memory device at the same time. A queue will develop wherein all but one of the separate processing units will have to wait for access to the main memory. The waiting processors cannot continue operations until their individual memory requests are completed.

In a multiprocessing system which comprises several independent processors that share a common main memory, the use of a small buffer memory with each processor to store the data with which the associated processor is operating has two advantages. First, the buffer memory is smaller and can, therefore, operate faster than the large main memory. Second, it reduces the demands on the main memory, decreasing the number of times a processor must wait for another processor to complete its memory requirements.

It is necessary and desirable for programing efficiency always to address the data by their addresses in the main memory even though most of the data will be used from a buffer. The assignments of memory locations are facilitated and the same data may be used by several processors. The buffer memory, which has fewer locations than the main memory, must be organized to use the main memory address, either to locate the data or to determine that the data is not in the buffer.

If the addressed data is not in the buffer memory, the main memory will be accessed for the data, which will be transmitted to the processor as the response to the processor data request and the data will also be stored in the buffer memory. Transfer from the main memory to the buffer memory of large numbers of words (blocks) in the vicinity of the desired data improves the efficiency of a buffer system because most programs use data that is in adjacent locations of the main memory. Therefore, when an addressed word is not in the buffer, transferring several words adjacent thereto in the main memory together with the addressed word to the buffer memory increases the probability that subsequently addressed words will be in the buffer.

Prior art systems have solved the problem of addressing the buffer memory with a main memory address by using address transformation schemes.

An object of this invention is to provide in a system including one or more buffer memories with, or as a portion of, the main memory, a more efficient solution to the problem discussed above.

Another object of this invention is to provide a memory system that will improve the performance of data processing units connected thereto.

It is another object of this invention to provide an information retrieval system that combines large storage capacity with fast access.

BRIEF SUMMARY OF THE INVENTION

A memory system stores in each location data and an identifier. The address is composed of a tag segment and a locator segment which specifies the location in the memory. The data and its associated identifier are extracted from the memory location specified by the locator segment of the address and the extracted identifier is compared to the tag segment of the address.

BRIEF DESCRIPTION OF THE DRAWING

In various of the figures, similar parts are identified by the same reference numerals.

DETAILED DESCRIPTION OF THE INVENTION

In the following description "word" means any group of digits or alphanumeric characters taken together. Words or groups of words may also be referred to as "blocks". A cell is an addressable location in a memory containing a word or group of words. Location in a memory refers to the subset thereof individually addressable by external means. Contents of a location may be a cell or group of cells.

Figure 1:
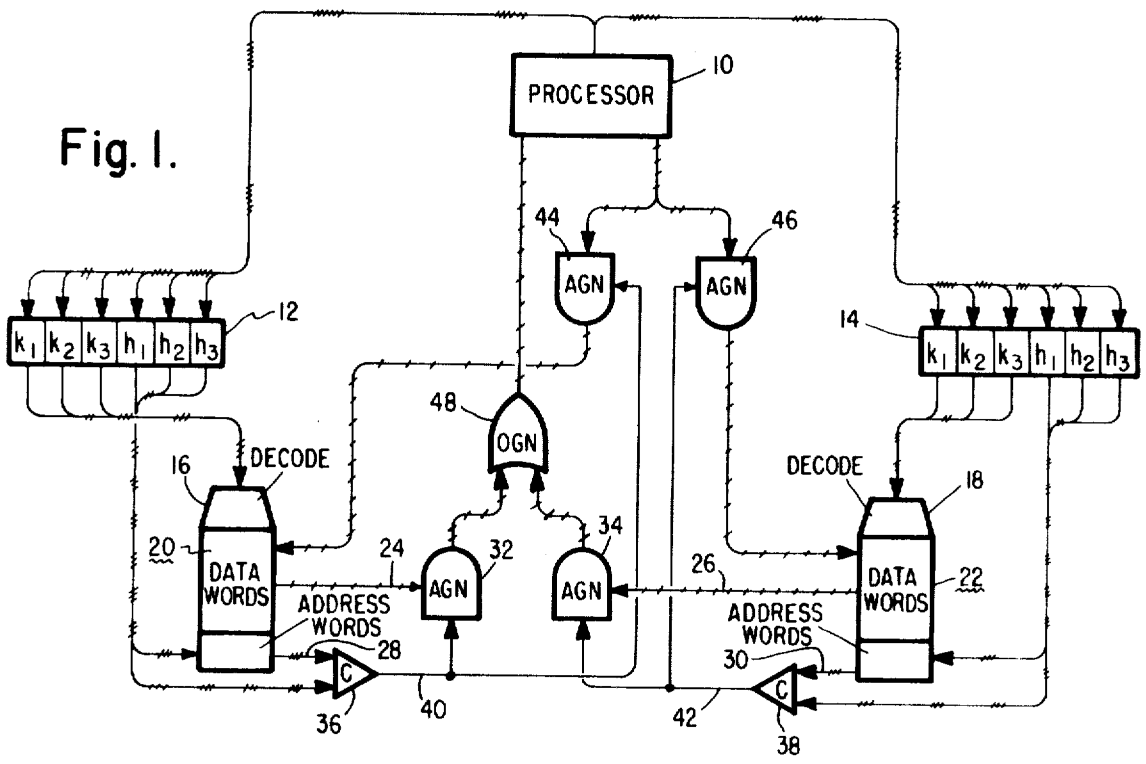
FIG. 1 is a block diagram of one embodiment of the invention wherein one processor is coupled to several memories.

The first section of this description pertains to the use of several memory units by one processor. A preferred embodiment is illustrated in FIG. 1. All the parts shown therein are well known in the art and require no detailed operational description here. Hatched lines represent more than one wire or connection.

The processor 10 is any specialized or general purpose electronic data processor or scientific computer which usually operates by the sequential performance of programmed instructions. Data required for the operation of the instructions are stored in memory units such as the first memory unit 20 and the second memory unit 22. Only two memory units are shown for clarity of drawing and explanation. However, any convenient number may be connected using the techniques to be described.

The memory units 20 and 22 have address decoders 16 and 18 which receive the address of the location to be accessed. Contents of the addressed location are stored in two parts, a data storage part and an address word part. The address registers 12 and 14 are coupled to receive from the processor 10 the address of the data required by the operation in progress in the processor. The address register contents are partitioned into a $k$-digits and an $h$-digits subset; the $k$-digits subset is coupled to the memory unit decoders 16 and 18.

The comparators 36 and 38 each comprise two sets of inputs and an output. The output is activated when the corresponding digits of the first and second inputs are equal. The first set of inputs of each comparator 36 and 38 is connected to the $h$-digits subset of the associated address register 12 or 14 and the second set of inputs is connected to the output of the address word section of the associated memory unit 20 or 22.

The data outputs of each memory unit 20 and 22 are connected to corresponding AND gate networks (AGN) 32 and 34 by the cables 24 and 26. The AND gate networks 32 and 34 are enabled by the output of the corresponding comparator 36 or 38 by the wires 40 and 42. The output of the AND gate networks 32 and 34 are each connected to an input of an OR gate network 48, the outputs of which are the data return lines to the processor. The AND gate networks 44 and 46 are provided to direct a word to be stored from the processor 10 to the proper memory unit 20 or 22.

When data are required by the processor 10 for the operation of the current instruction therein, the address is transmitted to the first and second address registers 12 and 14. The $k$-digits subset of each register is decoded by the associated memory address decoder 16 and 18 of the corresponding first and second memory units 20 and 22. The data stored in the first memory unit 20 primes the AND gate network 32 by means of the cable 24 and the data stored in the second memory unit 22 primes the AND gate network 34. The $h$-digits subset of each address register 12 and 14 is transmitted to the first and second comparators 36 and 38, respectively. The address word at the addressed location of each memory unit 20 and 22 is transmitted to the respective comparators 36 and 38 by means of the cables 28 and 30.

If the address word in the addressed location of the first memory unit 20 is the same as the $h$-digits subset of the first address register 12, the output of the comparator 36 enables the AND gate network 32. Similarly, if the address word in the addressed location of the second memory unit 22 is equal to the $h$-digits subset of the second address register 14, the output of the comparator 38 will enable the AND gate network 34 by means of the line 42. The output of one of the AND gate networks 32 or 34 in the memory unit 20 or 22 in which the requested data were stored enables the OR gate network 48 which transmits the requested data to the processor 10.

To store data in one of the memory units 20 or 22, the same addressing operation is performed. The output of the comparator 36 or 38, depending on which memory unit contains the correct address word, will enable the AND gate network 44 or 46, transmitting the data to be written to the proper memory unit 20 or 22. A control line, one of the output lines from the processor 10, is used to signal the memory unit that data is to be stored.

It is also possible to interchange address words among the memory units. The address transmitted from the processor to the address register 12 or 14 has, as the $k$-digits subset, the address wherein the new address word is to be stored. The $h$-digits subset of the address register contains the new address word to be stored. The address words initial distribution among the memory units, and subsequent modification thereof, is performed by storing the address words of each memory unit according to any desired scheme. The assignment of address words can be based on randomness, known usage patterns, a cyclic scheme, or some other method thereby permitting a great degree of flexibility.

The foregoing description demonstrates how the partitioning of the address makes the use of several small memories more effective than that of a large memory. The memories are addressed as if they comprised one large one, thereby eliminating the programing difficulties that would arise because of the need to direct the address to a specific memory unit and then address that unit. The invention provides the flexibility of a large memory with the speed of a small one. Furthermore, the modularization of the memory reduces maintenance problems associated with large memories because it permits removal and repair of individual memory units while the rest of the system remains operative.

The six stage address register in FIG. 1 can address $2^6$, or 64 locations. Each memory shown has eight locations and, therefore, a complete system for the processor as shown in FIG. 1 would include eight memory units instead of two. In actual systems, $n$ would be larger than six and could be partitioned in $n-1$ different ways. Each memory unit would contain $2^k$ locations and $2^h$ memory units would be required to store $2^n$ locations, where $n=k+h$. The partitioning of the memory address permits faster processing cycles than systems of the prior art.

Each memory cycle, using one memory, would be the time required for a read and a write cycle. In the invention, each memory cycle is only the time required for the read cycle unless the same memory is accessed twice in succession. In general, if the locations are distributed throughout $2^k$ memory units randomly, then the memory cycle time can be closely approximated by $$t_m=t_r+t_w/2^k$$

where $t_m$= total memory cycle time $t_r$= memory read cycle time, and, $t_w$= memory write cycle time.

When $k=3$, the time $t_m$ would be approximated by $t_m=t_r+t_w/8$. The above formula is based on an approximately normal distribution of the memory addresses so that each memory is accessed twice in succession 1/8 of the time. The other advantage in the embodiment shown in FIG. 1 results from the fact that a small memory has a faster cycle time than a large memory.

The following descriptions pertain to the embodiments of the invention applicable to systems wherein several processors are coupled to one or more common main memories. The system illustrated in FIG. 2 contains two memories, a main memory 52 and a buffer memory 20. For purposes of illustration and description, the main memory 52 is shown as a 64 word memory and the buffer memory 20 contains eight addressable words. In a practical system, the main memory 52 would be shared by several processing systems, each having an associated buffer memory 20.

A processor (not shown) supplies an address to the address register 12 which is partitioned into $h$- and $k$-digits subsets. As in the system described above, each location of the buffer memory 20 is divided into two parts, a data part and an address word part. The address word part is coupled to one input of a comparator 36, the other input of which is the $n$-digits subset of the address register 12. The comparator 36 has two outputs, one of which is operative when the address word of the addressed location of the buffer memory 20 is equal to the $h$-digits subset of the address register 12; the other output of the comparator 36 is operative when they are not equal.

The processor (not shown) provides an address to the address register 12. The $k$-digits subset is decoded by the decoder 16 which initiates retrieval of the contents of the addressed location. The data part of the contents of the addressed location primes the AND gate network 32. If the $h$-digits subset of the contents of the address register 12 are equal to the address word part of the addressed location from the buffer memory 20, the equality output of the comparator 36 enables the AND gate network 32, the output of which is coupled to the OR gate network 48. The output of the OR gate network 48 transfers the data to the processor.

When the $h$-digits subset is not equal to the address word part of the addressed location from the buffer memory 20, the inequality output of the comparator 36 enables the AND gate network 50. The other inputs of the AND gate network 50 are all of the bits of the address register 12. Therefore, when the addressed word is not in the buffer memory 20, the address thereof is transmitted to the main memory 52. The output of the main memory primes the AND gate network 44 and the OR gate network 48, the latter transferring the data to the processor. The $h$-digits subset of the address register primes the AND gate network 54. The AND gate networks 44 and 54 are enabled by the inequality output of the comparator 36 to store the addressed word retrieved from the main memory 52 in the correct location of the buffer memory 20 together with the address word comprising the $h$-digits subset of the address.

During the operations described, the processor receives the data from the addressed location whether it is in the buffer memory 20 or in the main memory 52. When the addressed word is in the buffer memory 20, the access time is shorter than when the addressed word must be retrieved from the main memory. Another aspect of the system illustrated in FIG. 2 is that whenever a word is retrieved from the main memory 52, it is stored in the buffer memory 20.

Use is made in the present invention of the property that the same data locations of the main memory are repeatedly used during the execution of a program. Rather than reading a small amount of data each time it is necessary to access the main memory, each block of data transferred from the main memory 52 to the buffer memory 20 may consist of several hundred words. This transfer of a relatively large block of data every time the addressed word is not available in the buffer memory 20 results in fewer accesses to the main memory 52 and reduces substantially the data processing time.

Assuming a realistic 50ns reference time for the buffer memory and 400ns main memory cycle time, the improvement in performance time using the invention can be demonstrated. If the addressed word is not in the buffer memory 20, the total block transfer time is 450ns (50ns to test the buffer memory plus 400ns to access the main memory). If 100 percent of the data requests require block transfer from the main memory to the buffer memory, the memory cycle time will be 450ns. If all data requests can be served by the buffer memory, the memory cycle time will be 50ns. If 10 percent of the requests for data require a block transfer (a realistic figure), the average memory cycle time will be 0.9×50ns+0.1×450ns, or 90ns. The queueing probabilities in the system described are also reduced so that the invention also reduces the average memory processor waiting time. The total increase in processing speed is therefore greater than merely the increase of average memory accessing speed.

Figure 2:
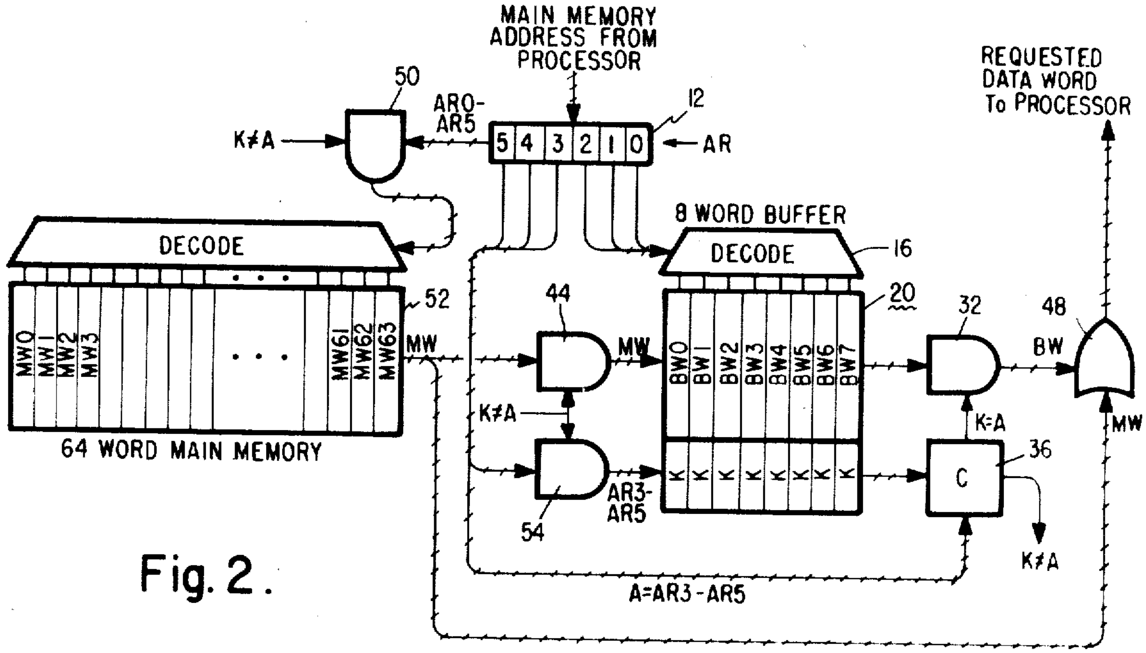
FIG. 2 is a block diagram of another embodiment of the invention wherein a computer uses a buffer memory for intermediate storage between it and the main memory.
Figure 3:
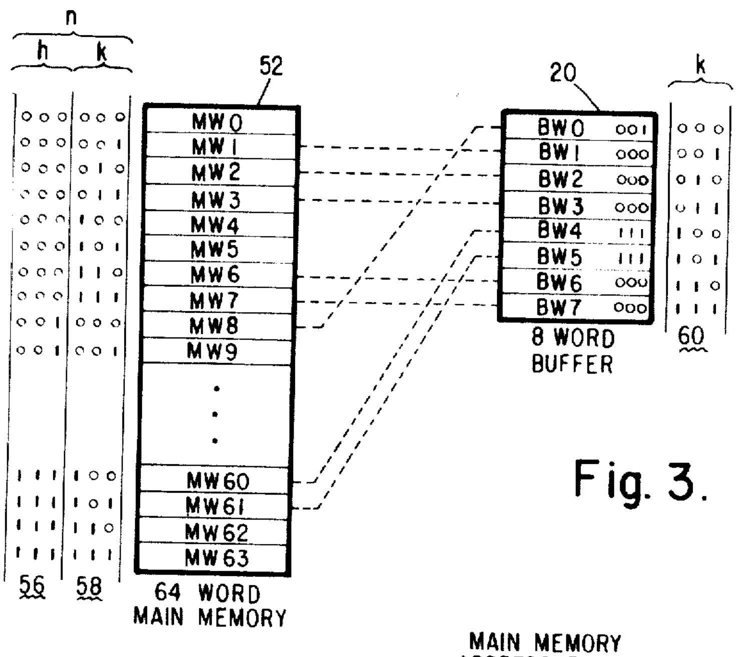
FIG. 3 is a diagram showing the mapping of a hypothetical distribution of main memory words in the buffer memory in the system shown in FIG. 2.

FIG. 3 is a hypothetical mapping of a situation which may arise in the system illustrated in FIG. 2. The column 56 represents the $h$-digits subset and the column 58 represents the $k$-digits subset of the main memory 52 address. The 64 word locations in the main memory 52 are connected with their corresponding hypothetical position in the buffer memory 20. The column 60 represents the addresses of the word locations in the buffer memory 20. The address word that would appear with each data word is also shown in the buffer memory 20.

The mapping in FIG. 3 shows the advantage of using the $k$-digits subset of the main memory addresses as the address for the buffer memory, viz, it permits the storage in the buffer memory of words that are in adjacent locations in the main memory. This is apparent by viewing what the consequences would be if the $h$-digits subset were used as the buffer memory address. As an example, suppose it was desired to store the address 101011 in the buffer memory. Using the $h$-digits subset, the buffer memory address would be 101 and the stored address word would be 011. No other word having the same address 101 could then be stored in the buffer memory because once used, that address is exhausted so far as the buffer memory is concerned. Therefore, the data words in the main memory at 101000, 101001, 101010, 10110, 101101, 101110—the adjacent words to 101011—could not be stored in the buffer memory. This would limit the usefulness of the buffer memory because it would be unable to store adjacent words from the main memory and, as already discussed, the processor, during the execution of a program, tends to use such adjacent words. However, using the $k$-digits subset as the buffer memory address as in the present invention avoids this disadvantage and permits the storage of adjacent words as seen by the mapping in FIG. 3.

The system of FIG. 2, an improvement over the prior art, can store only a limited number of combinations of eight words from the main memory. There are approximately $4.456\times10^9$ taken eight at a time. Hower, because two words which have the same $k$-digits subset can not be stored in the buffer memory of FIG. 2 at the same time, the number of combinations of the 64 main memory words that may be stored at one time in the buffer memory 20 of FIG. 2 is limited to $1.678\times10^7$, approximately 1.4 percent of the total possible combinations. For the general case, the number of combinations of $n$ things that may be taken $r$ at a time is given by $$\binom{n}{r}=\frac{n!}{r!(n-r)!}$$

Assuming that the radix of the memory address is $R$, the total number of addressable locations therein is $R^n$, where $n$ is the number of digits in the memory address. The number of combinations that can be stored in the buffer memory 20 of FIG. 2 is given by $$R^{kR^h}$$

out of $$\binom{R^n}{R^k}$$

Changing the partitioning of the $n$ digits of the main memory address will change the number of combinations of main memory words that can be stored in the buffer memory. The ratio of $$R^{kR^h}\Big/\binom{R^n}{R^k}$$

increases to a maximum of one as the value of $k$ approaches zero. This means, in effect, that the buffer memory address will be the same for all words in the buffer memory and the address word at each location will be the same as the main memory address at this maximum ratio value. A buffer memory meeting these requirements is a content addressable memory.

Figure 4:
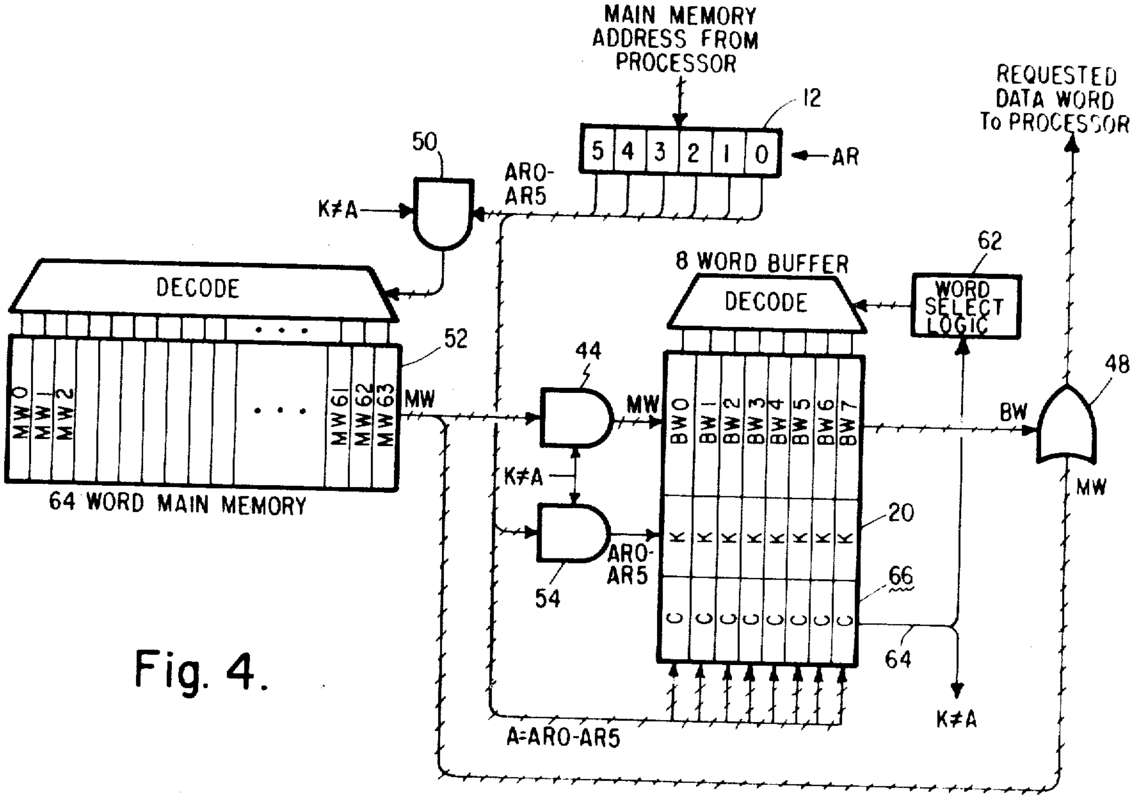
FIG. 4 is a block diagram of an embodiment of the machine using a content addressable memory as the buffer memory.

FIG. 4 illustrates a buffer memory system using a modified content addressable memory 20 as the buffer memory. A content addressable memory is a memory in which the addressed word or a portion thereof is equal to the address or a part thereof. The content addressable memory in FIG. 4 is a modified to permit a word to be addressed by specifying a location by supplying an address to the decoder, in addition to the unusual content addressable memory operation. As shown in FIG. 4, each location in the buffer memory 20 has a separate comparator to compare the contents of the location with which it is associated with the address word from the address register 12. A circuit is provided that furnishes an inequality output (a "mismatch" conductor signal) on conductor 64 to indicate that none of the address word parts of the stored words in the buffer memory 20 is equal to the address word in the address register 12. The inequality signal is coupled, inter alia, to a word select logic network 62, which, when activated, provides to the address decoder of the buffer memory 20, the address at which a new data is to be stored. The word select logic network 62 is used only for storing new data in the buffer memory and can be implemented in any of several ways to provide an address based on randomness, recency, a cyclic pattern, usage, or any other desired basis.

When the processor (not shown) furnishes an address word to the address register 12, it is compared to the address word part of every stored word in the buffer memory 20. If an equality (a "match") between the contents of the address register 20 and any of the stored address words is detected by the comparator 66, the data part of the stored word in the buffer memory 20 is transmitted to the OR gate network 48 and thence to the processor, completing the memory cycle.

If the address word in the address register 12 is not found in the buffer memory 20, a signal on the conductor 64 activates the word select logic network 62 and, via the AND gate network 50, transmits the address word from the address register 12 to the main memory 52. The output word from the main memory 52 is coupled to the OR gate network 48 and the AND gate network 44. The output of the OR gate network 48 transmits the output word to the processor as the response to the prsecessor's memory request. The inequality output signal also activates the AND gate networks 44 and 54, transmitting to the buffer memory 20 the word to be stored in the location specified by the word select logic network 62. This completes the memory cycle and the new word is now in the buffer memory 20.

The modified content addressable memory 20 represents the use of the invention with a partitioning of $k=0$ and $h=n$, permitting any combination of main memory words to be stored in the buffer.

The modified content addressable memory is, however, more expensive than the buffer memory used in the system illustrated in FIG. 2. Another embodiment of the invention makes a compromise between the restricted number of combinations of main memory words that can be stored in the buffer memory system as shown in FIG. 2 and the expense of a modified content addressable memory as shown in the system in FIG. 4. Such an embodiment is illustrated in FIG. 5.

Figure 5:
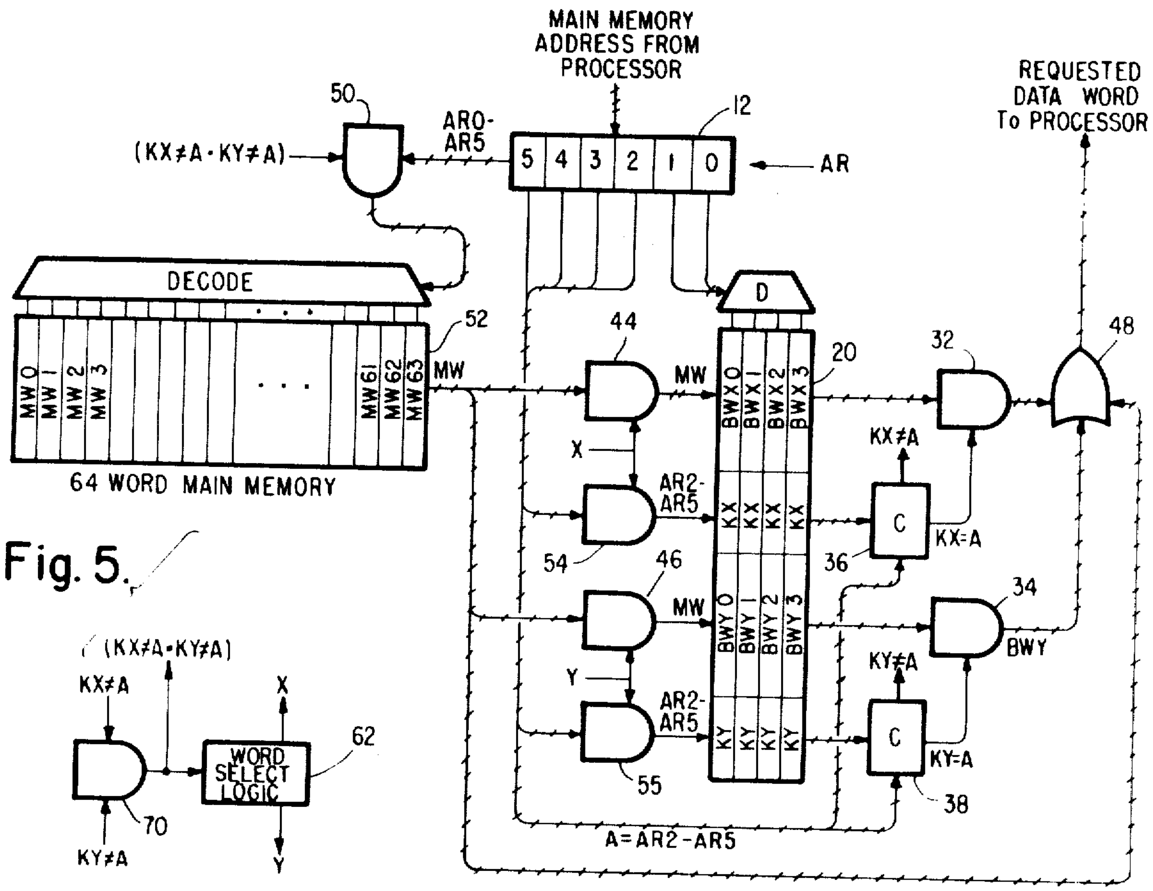
FIG. 5 is a block diagram of the embodiment of the invention using a buffer memory in which each location contains two data words and two address words.

The buffer memory 20 of the system shown in FIG. 5 has four addressable locations. The address word held in the address register 12 is partitioned so that $k=2$ and $h=4$, maintaining the valve of $n=6$ for illustration purposes. As before, though, the address word may be partitioned in $n-1$ different ways. Each location in the buffer memory 20 contains two cells, each cell containing an address word and a data word. As before, eight data words can be stored in the buffer memory 20. Each cell of the buffer memory 20 is provided with separate gating networks for the output and input words and also with separate comparators for each address word. In addition, a word select logic network 62 is provided having an input and two outputs; each output is associated with a different cell of the buffer memory 20. One of the outputs of the word select logic network 62 is activated by the excitation of the input which is coupled to the AND gate 70.

When the processor (not shown) requires data from the memory, an address word is placed in the address register 12. The $k$-digits subset of the address word selects and accesses a cell from the buffer memory 20. The address word from one cell, labeled X in FIG. 5, is applied to the first set of inputs of a comparator 36, and the address word of the other cell, labeled Y in FIG. 5 is applied to the first set of inputs of the comparator 38. The $h$-digits subset of the address word is applied to the second set of inputs of both comparators 36 and 38. The data output word of the X cell primes the AND gate network 32 and the data output word of the V cell primes the AND gate network 34. If the address word of the addressed X or Y cells correspond to the $h$-digits subset of the address word in the address register 12, the output of the comparator 36 will enable the AND gate network 32 or the output of the comparator 38 will enable the AND gate network 34, respectively. The outputs of the AND gate networks 32 and 34 are coupled to two sets of inputs of the OR gate network 48, the output of which transfers the requested data to the processor.

If the addressed data word is not in the buffer memory 20, the inequality output of both comparators 36 and 38 will be activated. Both inequality outputs of the comparators 36 and 38 are coupled to the AND gate 70, the output of which indicates that the addressed data word is not in the buffer memory 20. The output of the AND gate 70 enables the AND gate network 50, the other inputs of which are the digits of the address register 12, transferring the address word from the address register 12 to the decoder of the main memory 52. The output word of the addressed location of the main memory 52 is applied to the AND gate networks 44 and 46 and to the OR gate network 48. The $h$-digits subset of the address word in the address register 12 is applied to the AND gate networks 54 and 55. In response to the output of the AND gate 70, one of the outputs of the word select logic network 62 will enable the AND gate networks 44 and 54 or the AND gate networks 46 and 55 to store the new data word and new address word in the associated cell of the addressed location in the buffer memory 20.

Figure 6:
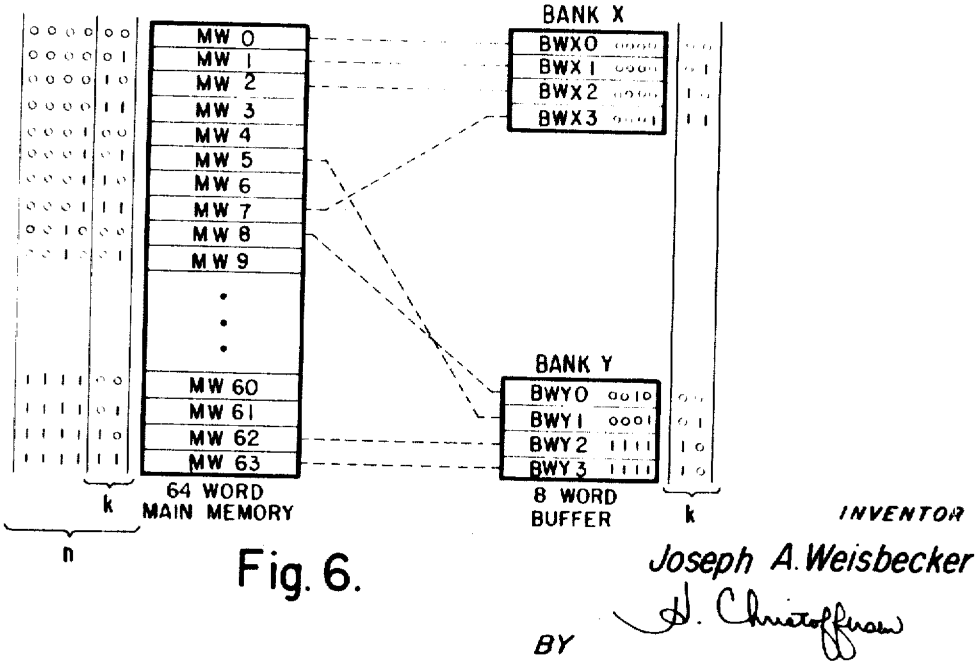
FIG. 6 is a diagram of a hypothetical mapping of a possible arrangement of main memory words stored in the buffer memory of the system illustrated in FIG. 5.

FIG. 6 illustrates a hypothetical mapping of one combination of eight buffer memory words out of the 64 main memory words that can be stored in the system illustrated in FIG. 5 and described above. If the number of cells or banks in each addressed location of the buffer memory 20 is denoted by $m$, the total number of combinations that can be stored in a system like that illustrated in FIG. 5 is given by $$\binom{R^h}{m}^{R^k}$$

. In the system shown in FIG. 5, $R=2$, $h=4$, $k=2$, $m=2$. The total number of combinations of eight data words of the 64 in the main memory 52 that can be stored in the buffer memory 20 is $2.074\times10^8$, or about 5 percent. This is more than a whole magnitude greater than the number possible with the system shown in FIG. 2 and can be accomplished at less cost than a system shown in FIG. 4. Changing the partitioning and number of cells in each location permits the invention to be used in any of a variety of ways, depending on which is most suitable for a particular application.

Figure 7:
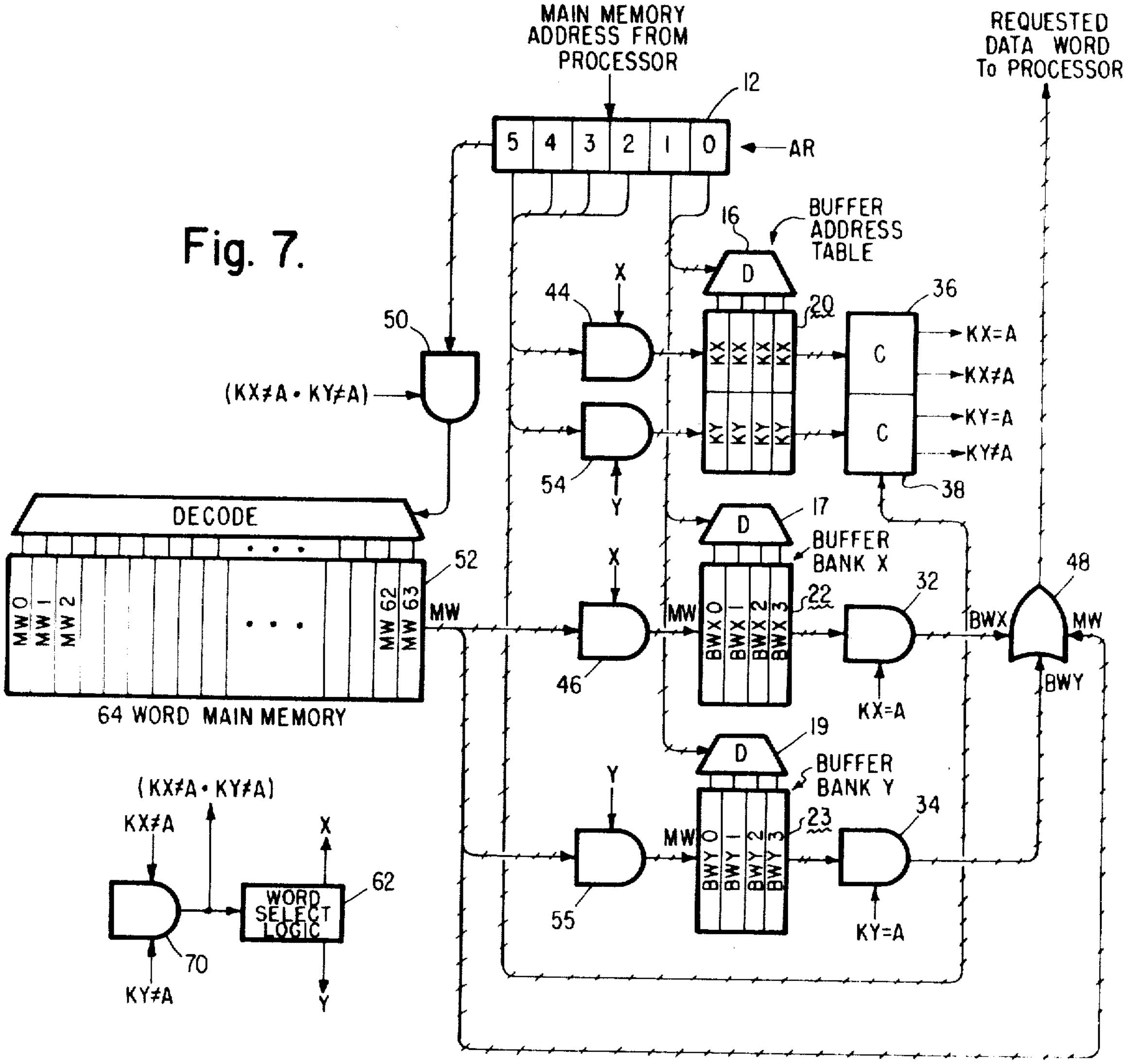
FIG. 7 is a block diagram of still another embodiment of the invention wherein separate memories are used for storing the data words and a separate buffer memory is used for storing the address words.

FIG. 7 illustrates another embodiment of the invention. The invention is able to utilize to great advantage the transfer of large blocks of data from the main memory to the buffer memory. As the number of cells in each addressed location of the buffer memory increases, the larger will become the number of digits in the output word. This increase in the output word size tends to increase the response time of the buffer memory. In the system shown in FIG. 7, the buffer memory is divided into a buffer address table memory 20, a buffer data memory bank X 22, and a buffer data memory bank Y 23. Each addressable location of the buffer address table memory 20 contains two address words, one of which is associated with the data word stored in the corresponding address of the buffer data memory bank X 22 and the other, with the data word stored in the corresponding address of the buffer data memory bank Y 23. In other respects, the system is similar to the system shown in FIG. 5 and the operation is the same.

The advantage of the system shown in FIG. 7 is that the speed of the separate memories 20, 22 and 23 is faster than that of the buffer memory 20 of FIG. 5 because of the smaller data output word size.

In the systems described above, the main memories have only 64 addressable locations and the buffer memories contain only eight main memory data words for purposes of illustration. Also, only one buffer memory arrangement was shown. In actual systems, the main memory might contain millions of addressable locations and the buffer memories several hundred data words. The partitioning of the address register and the number of banks were chosen merely as an example. The most suitable arrangements for particular applications will be obvious to the system designer ordinarily skilled in the art using the teachings of this invention.

What is claimed is:

1. The combination comprising:

memory means for storing data and an identifier in each of a plurality of locations therein;

addressing means for generating a tag segment and a locator segment for specifying a location in the memory means;

means responsive to the locator segment produced by the addressing means for extracting the data and identifier from the specified location in the memory means; and comparator means responsive to the identifier extracted and the tag segment produced by the addressing means for indicating equivalence therebetween.

2. The combination according to Claim 1 including:

main storage means for storing data in each of a plurality of locations therein;

means for extracting data from a location specified by the addressing means, responsive to the comparator means when no equivalence is indicated; and, selector means responsive to the comparator means for accepting the data extracted from the memory means when an equivalence is indicated and from the main storage means when an equivalence is not indicated.

3. The combination according to Claim 2 including:

writing means responsive to said comparator means for storing the data extracted from the main storage means and the tag segment in the memory means at the location specified by the locator segment.

4. The combination comprising:

addressing means producing $n$ digits, said digits partitioned into two mutually exclusive subsets of $h$ and $k$ digits so that $h+k=n$ for addressing $R^n$ locations where R is the radix of the address;

first memory means having $R^h$ storage locations, coupled to said addressing means, addressable by the $h$ digits subset of the addressing means, each storage location storing an address word of $k$ digits and a data word;

reading means for extracting from the first memory means the contents of the addressed storage location;

comparator means responsive to the reading means and the $k$ digits subset of the addressing means for indicating when an equality exists therebetween; and selecting means responsive to the comparator means for selecting the data word extracted when an equality is indicated.

5. The combination claimed in Claim 4 including:

second memory means having $R^n$ locations, each location storing a data word;

means responsive to the comparator means coupling the addressing means to the second memory means when no equality is indicated; and means for extracting the addressed data word from the second memory means.

6. The combination claimed in Claim 5 including:

means for storing the word extracted from the second memory means together with the $k$ digits subset of the addressing means in the first memory means at the location addressed by the $h$ digits subset of the addressing means.

7. The combination claimed in Claim 6 including: external means coupled to provide address digits to the addressing means and to accept the selected data word.

8. The combination comprising:

addressing means partitioned into first and second parts, each part producing outputs;

memory means coupled to the addressing means, including in each of a plurality of locations $n$ cells, each cell containing a data word and an associated address word, where $n$ is an integer;

means responsive to outputs produced by the first part of the addressing means for extracting from the memory means the data and address words stored in the location specified by said outputs;

$n$ comparator means, each responsive to a different one of said retrieved address words and to outputs produced by the second part of the addressing means, for indicating an equality therebetween; and, means responsive to the comparator means for selecting the data word associated with the address word equal to the word represented by the outputs of the second part of the addressing means.

9. The combination claimed in Claim 8 including:

main storage means having locations addressable by the addressing means, each location storing a data word; and means for extracting the addressed data word from the main storage when no equality exists between the retrieved address words and the second part of the addressing means.

10. The combination claimed in Claim 9 including:

means for storing in the memory means at a location addressed by the outputs of the first part of the addressing means, a data word extracted from the main storage means together with the outputs of the second part of the addressing means as the associated address word; and specifying means for specifying which of the $n$ cells is to receive the data word and associated address word.

11. The combination claimed in Claim 10 wherein the specifying means includes means for determining and specifying the cell at the addressed location used least frequently.

12. The combination claimed in Claim 10 wherein the specifying means includes means for specifying a cell in a random manner.

13. The combination claimed in Claim 10 wherein the specifying means includes means for specifying a cell in a cyclic manner.

14. The combination comprising:

addressing means comprising first and second parts each part producing outputs indicative of first and second words, respectively;

first memory means coupled to the addressing means having locations addressable by the first part of the addressing means, each location storing a plurality of data words;

second memory means coupled to the addressing means having locations addressable by the first part of the addressing means, each location storing a plurality of address words, each address word associated with the data word in the corresponding location in the first memory means;

first and second reading means for extracting from the first and second memory means, respectively, the contents of a location addressed by the first part of the addressing means;

a plurality of comparator means coupled to the second part of the addressing means and to said second reading means to indicate an equality between the outputs of the second part of the addressing means and each of the address words extracted; and means responsive to the comparator means for selecting the data word associated with the address word equal to the word represented by the outputs of the second part of the addressing means.

15. The combination claimed in Claim 14 including:

main storage means having locations addressable by the addressing means, storing in each location a data word; and means coupling responsive to the comparator means the addressing means to the main storage means for extracting the data word at the location addressed when no equality is indicated.

16. The combination claimed in Claim 15 including:

means for storing in the first memory means the data word extracted from the main storage means;

means for storing in the second memory means the word produced by the second part of the addressing means when a data word is extracted from the main storage means; and specifying means for specifying which of the plurality of word cells in the addressed location of the first and second memory means is to receive the word to be stored therein.

17. The combination claimed in Claim 16 wherein the specifying means includes means for specifying a word cell in a random manner.

18. The combination claimed in Claim 16 wherein the specifying means includes means for specifying a word cell in a cyclic manner.

19. The combination comprising:

addressing means;

output means;

main memory means, storing in each location thereof a data word;

content addressable memory means coupled to said addressing means and containing addressable locations, each location storing a data word and an address word on which said content addressable memory is addressed;

means for coupling the addressing means to the main memory means when no location is accessed in the content addressable memory; and, means for coupling to the output means the addressed data word from the content addressable memory, or from the main memory means when the addressed data word is not in the content addressable memory.

20. The combination claimed in Claim 19 including:

means for storing a data word addressed in the main memory means and the address thereof in a location of the content addressable memory.

21. The combination claimed in Claim 20 including:

external means for generating an address in the addressing means and for accepting a data word from the output means.

Disclaimer 3,601,812.—*Joseph A. Weisbecker*, Cherry Hill, N.J. MEMORY SYSTEM. Patent dated Aug. 24, 1971. Disclaimer filed May 4, 1972, by the assignee, *RCA Corporation*.

Hereby enters this disclaimer to claims 1 through 7 and 19 through 21 of said patent.

[*Official Gazette January 2, 1973.*]